US012773839B2

(12) United States Patent
Cheng et al.

(10) Patent No.: US 12,773,839 B2
(45) Date of Patent: Oct. 27, 2026

(54) SUBSTRATE COMPRISING AN EDGE SURFACE

(71) Applicant: CORNING INCORPORATED, Corning, NY (US)

(72) Inventors: Yu Cheng, New Taipei City (TW); Fang-Yu Hsu, Taichung City (TW); Weirong Jiang, Sarasota, FL (US); Peter Joseph Lezzi, Corning, NY (US); Samuel Odei Owusu, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 464 days.

(21) Appl. No.: 18/222,030

(22) Filed: Jul. 14, 2023

(65) Prior Publication Data

US 2024/0019904 A1 Jan. 18, 2024

Related U.S. Application Data

(60) Provisional application No. 63/390,010, filed on Jul. 18, 2022.

(51) Int. Cl.
*B32B 17/06* (2006.01)

(52) U.S. Cl.
CPC .......... *B32B 17/06* (2013.01); *B32B 2315/02* (2013.01); *B32B 2315/08* (2013.01); *B32B 2457/20* (2013.01)

(58) Field of Classification Search
CPC ................ B32B 17/06; B32B 2315/02; B32B 2315/08; B32B 2457/20
USPC .......................................................... 428/192
See application file for complete search history.

(56) References Cited

U.S. PATENT DOCUMENTS

| | | | |
|---|---|---|---|
| 8,607,590 | B2 | 12/2013 | Glaesemann et al. |
| 8,854,623 | B2 | 10/2014 | Fontaine et al. |
| 9,766,731 | B2 | 9/2017 | Lee |
| 10,094,046 | B2 | 10/2018 | Haramein |

(Continued)

FOREIGN PATENT DOCUMENTS

| | | |
|---|---|---|
| CN | 112520993 A | 3/2021 |
| CN | 112919818 A | 6/2021 |

(Continued)

OTHER PUBLICATIONS

International Search Report and Written Opinion of the International Searching Authority; PCT/US2023/027575; dated Oct. 30, 2023; 12 pages; European Patent Office.

*Primary Examiner* — Betelhem Shewareged
(74) *Attorney, Agent, or Firm* — William M. Johnson

(57) ABSTRACT

An edge surface includes a first peripheral surface extending between a first major surface and an outer peripheral surface of a substrate. The first peripheral surface includes a first depth and a first width. In aspects, the first depth is from about 4 micrometers to about 12 micrometers, and the first width is from about 30 micrometers to about 50 micrometers. In aspects, the first depth is from about 14 micrometers to about 24 micrometers, and the first width is from about 40 micrometers to about 60 micrometers. In aspects, a ratio of the first depth to a substrate thickness is from about 0.2 to about 0.4, a ratio of the first width to the substrate thickness is from about 1 to about 1.55, and a ratio of the first width to the first depth is from about 2 to about 8.

19 Claims, 4 Drawing Sheets

(56) References Cited

U.S. PATENT DOCUMENTS

| | | | |
|---|---|---|---|
| 2011/0019354 A1 | 1/2011 | Prest et al. | |
| 2015/0165548 A1* | 6/2015 | Marjanovic | C03B 33/091<br>219/121.73 |
| 2016/0299589 A1 | 10/2016 | Lee | |
| 2018/0057959 A1 | 3/2018 | Haramein | |
| 2020/0057470 A1 | 2/2020 | Buono et al. | |
| 2020/0278541 A1 | 9/2020 | Kim et al. | |
| 2020/0399158 A1 | 12/2020 | Alderman et al. | |
| 2021/0078899 A1* | 3/2021 | Da | C03C 3/091 |
| 2024/0019904 A1* | 1/2024 | Cheng | G06F 1/1656 |

FOREIGN PATENT DOCUMENTS

| | | | |
|---|---|---|---|
| CN | 113149449 | A | 7/2021 |
| JP | 05-040022 | A | 2/1993 |
| JP | 07-140450 | A | 6/1995 |
| TW | 201636312 | A | 10/2016 |
| WO | 2014/189775 | A1 | 11/2014 |

* cited by examiner

SUBSTRATE COMPRISING AN EDGE SURFACE

CROSS-REFERENCE TO RELATED APPLICATION

This application claims the benefit of priority under 35 U.S.C. § 119 of U.S. Provisional Application Ser. No. 63/390,010 filed on Jul. 18, 2022, the content of which is relied upon and incorporated herein by reference in its entirety.

FIELD

The present disclosure relates generally to substrates comprising an edge surface and, more particularly, to substrates comprising an edge surface with an outer peripheral surface, a first peripheral surface, and a second peripheral surface.

BACKGROUND

Foldable substrates are commonly used, for example, in display applications, for example, liquid crystal displays (LCDs), electrophoretic displays (EPD), organic light-emitting diode displays (OLEDs), plasma display panels (PDPs), or the like.

There is a desire to develop displays as well as protective covers to mount on displays. Displays and covers should have good impact and puncture resistance. At the same time, displays and covers should be foldable, for example having small parallel plate distances (e.g., about 10 millimeters (mm) or less).

Consequently, there is a need to develop substrates for display apparatus and/or foldable apparatus that have high transparency, low haze, low minimum parallel plate distances, and good edge strength.

SUMMARY

There are set forth herein substrates comprising an edge surface between a first major surface and a second major surface. Dimensions (e.g., first width, second width, first depth, second depth, ratios thereof, and ratios relative to the substrate thickness) of a first peripheral surface between an outer peripheral surface of the edge surface and the first major surface and/or a second peripheral surface between the outer peripheral surface and the second major surface can reduce damage to the substrate, simplify handling of the substrate, and/or improve the edge strength of the substrate without impairing subsequent processing of the substrate (e.g., coating).

Damage to the substrate can be reduced by avoiding stress concentrations (e.g., from sharp corners). For example, the first peripheral surface and/or the second peripheral surface take the place of sharp corners between the first major surface and an initial edge surface. Likewise, providing a ratio of the first width to the first depth and/or a ratio of the second width to the second depth in a range from about 2 to about 8 (e.g., from about 2 to about 4, from about 4 to about 8, from about 4 to about 6, from about 4 to about 5.5) can provide an angle where the corresponding peripheral surface meets the corresponding major surface that reduces stress concentrations. Also, providing a ratio of the first depth and/or the second depth to the substrate thickness from about 0.1 to about 0.4 (e.g., from about 0.15 to about from about 0.2 to about 0.4, from about 0.25 to about 0.35) can provide a thickness of the outer peripheral surface that is large enough to avoid stress concentrations where the first peripheral surface and the second peripheral surface meet the outer peripheral surface. Also, providing a ratio of the first width and/or the second width to the substrate thickness from about 0.3 to about 1.6 (e.g., from about to about 1.55, from about 1 to about 1.55) can separate the intersection of the corresponding peripheral surface with the corresponding major surface and the interaction of the corresponding peripheral surface with the outer peripheral surface, which can improve the edge strength of the substrate. One or more of these aspects (e.g., dimension and/or ratios recited above in this paragraph) can improve the edge strength (e.g., B10 edge strength of about 1000 MegaPascals (MPa) or more and/or from about 1200 MPa to about 1700 MPa, median edge strength of about 1700 MPa or more and/or from about 1900 MPa to about 2500 MPa).

For substrates comprising a thickness from about 25 micrometers (μm) to about 35 μm, providing a first depth and/or a second depth from about 4 μm to about 12 μm in combination with a first width and/or a second width from about 30 μm to about 50 μm can reduce damage to the substrate, simplify handling of the substrate, and improve the edge strength of the substrate. For substrates comprising a thickness of about 35 μm or more, providing a first depth and/or a second depth from about 14 μm to about 24 μm in combination with a first width and/or a second width from about 40 μm to about 60 μm can reduce damage to the substrate, simplify handling of the substrate, and improve the edge strength of the substrate.

Providing a ratio of the first depth and/or the second depth to the substrate thickness from about 0.1 to about 0.4 (e.g., from about 0.15 to about 0.4, from about 0.2 to about 0.4, from about 0.25 to about 0.35) can provide a thickness of the outer peripheral surface that is large enough such that the edge surface is blunt enough to reduce handling concerns, which can simplify handling of the substrate.

Providing a ratio of the first width to the first depth and/or a second width to the second depth in a range from about 2 to about 8 (e.g., from about 2 to about 4, from about 4 to about 8, from about 4 to about 6, from about 4 to about 5.5) can provide a corresponding peripheral surface that is shallow enough to prevent a viscous material disposed over the corresponding major surface from flowing off the edge surface, which allows in-situ formation of coatings on the substrate. Avoiding the viscous fluid from flowing off the edge surface can reduce material waste, avoid contamination of processing equipment, and/or additional cleaning to remove such viscous fluid.

Providing the substrate comprising a glass-based material or a ceramic-based material can enhance puncture resistance and/or impact resistance. Further, such substrates may be chemically strengthened to further enhance impact resistance and/or puncture resistance of the foldable apparatus. Also, the edge surface comprising the peripheral surfaces described herein can improve bendability (e.g., achieving a parallel plate distance in a range from about 1 mm to about 10 mm) by removing stress concentrations on the edge of the substrate.

Some example aspects of the disclosure are described below with the understanding that any of the features of the various aspects may be used alone or in combination with one another.

Aspect 1. A substrate comprising:

a first major surface extending along a first plane;

a second major surface extending along a second plane substantially parallel to the first plane;

a substrate thickness in a range from about 25 micrometers to about 35 micrometers, the substrate thickness defined between the first plane and the second plane in a thickness direction perpendicular to the first major surface; and an edge surface extending between the first major surface and the second major surface, the edge surface comprising an outer peripheral point, the edge surface comprising:

an outer peripheral surface comprising a portion of the edge surface within 5 micrometers of an outer plane, the outer plane is perpendicular to the first major surface and intersects the outer peripheral point;

a first peripheral surface extending between the first major surface and the outer peripheral surface comprising:

a first depth defined as a minimum distance between the outer peripheral surface and the first plane in the thickness direction is in a range from about 4 micrometers to about 12 micrometers; and a first width defined as a minimum distance between the outer peripheral surface and the first major surface along a first direction that the first plane extends along is in a range from about 30 micrometers to about 50 micrometers; and a second peripheral surface extending between the second major surface and the outer peripheral surface comprising:

a second depth defined as a minimum distance between the outer peripheral surface and the second plane in the thickness direction is in a range from about 4 micrometers to about 12 micrometers; and a second width defined as a minimum distance between the outer peripheral surface and the second major surface along the first direction that the first plane extends along is in a range from about 30 micrometers to about 50 micrometers.

Aspect 2. The substrate of aspect 1, wherein the first depth is in a range from about 6 micrometers to about 10 micrometers.

Aspect 3. The substrate of any one of aspects 1-2, wherein a ratio of the first width to the substrate thickness is in a range from about 1 to about 1.6.

Aspect 4. The substrate of aspect 3, wherein the ratio of the first width to the substrate thickness is in a range from about 1.1 to about 1.55.

Aspect 5. The substrate of any one of aspects 1-4, wherein a ratio of the first width to the first depth is in a range from about 4 to about 8.

Aspect 6. The substrate of aspect 5, wherein the ratio of the first width to the first depth is in a range from about 4 to about 6.

Aspect 7. The substrate of any one of aspects 1-6, wherein a ratio of the first depth to the substrate thickness is in a range from about 0.2 to about 0.4.

Aspect 8. The substrate of aspect 7, wherein the ratio of the first depth to the substrate thickness is in a range from about 0.25 to about 0.35.

Aspect 9. A substrate comprising:

a first major surface extending along a first plane;

a second major surface extending along a second plane substantially parallel to the first plane;

a substrate thickness of about 35 micrometers or more, the substrate thickness defined between the first plane and the second plane in a thickness direction perpendicular to the first major surface; and an edge surface extending between the first major surface and the second major surface, the edge surface comprising an outer peripheral point, the edge surface comprising:

an outer peripheral surface comprising a portion of the edge surface within 5 micrometers of an outer plane, the outer plane is perpendicular to the first major surface and intersects the outer peripheral point;

a first peripheral surface extending between the first major surface and the outer peripheral surface comprising:

a first depth defined as a minimum distance between the outer peripheral surface and the first plane in the thickness direction is in a range from about 14 micrometers to about 24 micrometers; and a first width defined as a minimum distance between the outer peripheral surface and the first major surface along a first direction that the first plane extends along is in a range from about 40 micrometers to about 60 micrometers; and a second peripheral surface extending between the second major surface and the outer peripheral surface comprising:

a second depth defined as a minimum distance between the outer peripheral surface and the second plane in the thickness direction is in a range from about 14 micrometers to about 24 micrometers; and a second width defined as a minimum distance between the outer peripheral surface and the second major surface along the first direction that the first plane extends along is in a range from about 40 micrometers to about 60 micrometers.

Aspect 10. The substrate of aspect 9, wherein the substrate thickness is in a range from about 35 micrometers to about 300 micrometers.

Aspect 11. The substrate of aspect 10, wherein the substrate thickness is in a range from about 50 micrometers to about 200 micrometers.

Aspect 12. The substrate of any one of aspects 9-11, wherein a ratio of the first width to the substrate thickness is in a range from about 0.3 to about 1.6.

Aspect 13. The substrate of aspect 12, wherein the ratio of the first width to the substrate thickness is in a range from about 0.5 to about 1.55.

Aspect 14. The substrate of any one of aspects 9-13, wherein a ratio of the first width to the first depth is in a range from about 2 to about 4.

Aspect 15. The substrate of aspect 14, wherein the ratio of the first width to the first depth is in a range from about 2.5 to about 3.

Aspect 16. The substrate thickness of any one of aspects 9-15, wherein a ratio of the first depth to the substrate thickness is in a range from about 0.15 to about 0.4.

Aspect 17. The substrate of aspect 16, wherein the ratio of the first depth to the substrate thickness is in a range from about 0.15 to about 0.35.

Aspect 18. A substrate comprising:

a first major surface extending along a first plane;

a second major surface extending along a second plane substantially parallel to the first plane;

a substrate thickness defined between the first plane and the second plane in a thickness direction perpendicular to the first major surface; and an edge surface extending between the first major surface and the second major surface, the edge surface comprising an outer peripheral point, the edge surface comprising:

an outer peripheral surface comprising a portion of the edge surface within 5 micrometers of an outer plane, the outer plane is perpendicular to the first major surface and intersects the outer peripheral point;

a first peripheral surface extending between the first major surface and the outer peripheral surface comprising a first depth defined as a minimum distance between the outer peripheral surface and the first plane in the thickness direction, and a first width defined as a minimum distance between the outer peripheral surface and the first major surface along a first direction that the first plane extends along; and a second peripheral surface extending between the second major surface and the outer peripheral surface comprising a second depth defined as a minimum distance between the outer peripheral surface and the second plane in the thickness direction, and a second width defined as a minimum distance between the outer peripheral surface and the second major surface along the first direction that the first plane extends along, wherein a ratio of the first depth to the substrate thickness is in a range from about 0.2 to about 0.4, a ratio of the first width to the substrate thickness is in a range from about 1 to about 1.55, and a ratio of the first width to the first depth is in a range from about 2 to about 8.

Aspect 19. The substrate of aspect 18, wherein the ratio of the first width to the first depth is in a range from about 2 to about 6.

Aspect 20. The substrate of aspect 19, wherein the ratio of the first width to the first depth is in a range from about 2.5 to about 3.

Aspect 21. The substrate of aspect 19, wherein the ratio of the first width to the first depth is in a range from about 4 to about 5.5.

Aspect 22. The substrate of any one of aspects 18-21, wherein the ratio of the first depth to the substrate thickness is in a range from about 0.25 to about 0.35.

Aspect 23. The substrate of any one of aspects 1-22, wherein the first depth is substantially equal to the second depth.

Aspect 24. The substrate of any one of aspects 1-23, wherein the first width is substantially equal to the second width.

Aspect 25. The substrate of any one of aspects 1-24, wherein the substrate comprises a glass-based material or a ceramic-based material.

Aspect 26. The substrate of any one of aspects 1-25, wherein the first major surface comprises a first compressive stress region extending to a first depth of compression from the first major surface and a maximum first compressive stress of about 400 MegaPascals or more, and the second major surface comprises a second compressive stress region extending to a second depth of compression from the second major surface and a maximum second compressive stress of about 400 MegaPascals or more.

Aspect 27. The substrate of aspect 26, wherein the edge surface comprises an edge compressive stress region extending to an edge depth of compression from the edge surface and a maximum edge compressive stress of about 400 MegaPascals or more.

Aspect 28. The substrate of aspect 27, wherein the maximum edge compressive stress is substantially equal to the maximum first compressive stress.

Aspect 29. The substrate of any one of aspects 1-28, wherein the substrate comprises a stress under which a probability of failure is lower than 10% for a two-point bend test (B10 edge strength) of about 1000 MegaPascals or more.

Aspect 30. The substrate of aspect 29, wherein the B10 edge strength is in a range from about 1200 MegaPascals to about 1700 MegaPascals.

Aspect 31. The substrate of any one of aspects 1-28, wherein a median edge strength in a two-point bend test is about 1700 MegaPascals or more.

Aspect 32. The substrate of aspect 31, wherein a median edge strength in a two-point bend test is in a range from about 1900 MegaPascals to about 2500 MegaPascals.

BRIEF DESCRIPTION OF THE DRAWINGS

The above and other features and advantages of aspects of the present disclosure are better understood when the following detailed description is read with reference to the accompanying drawings, in which.

Figure 1:
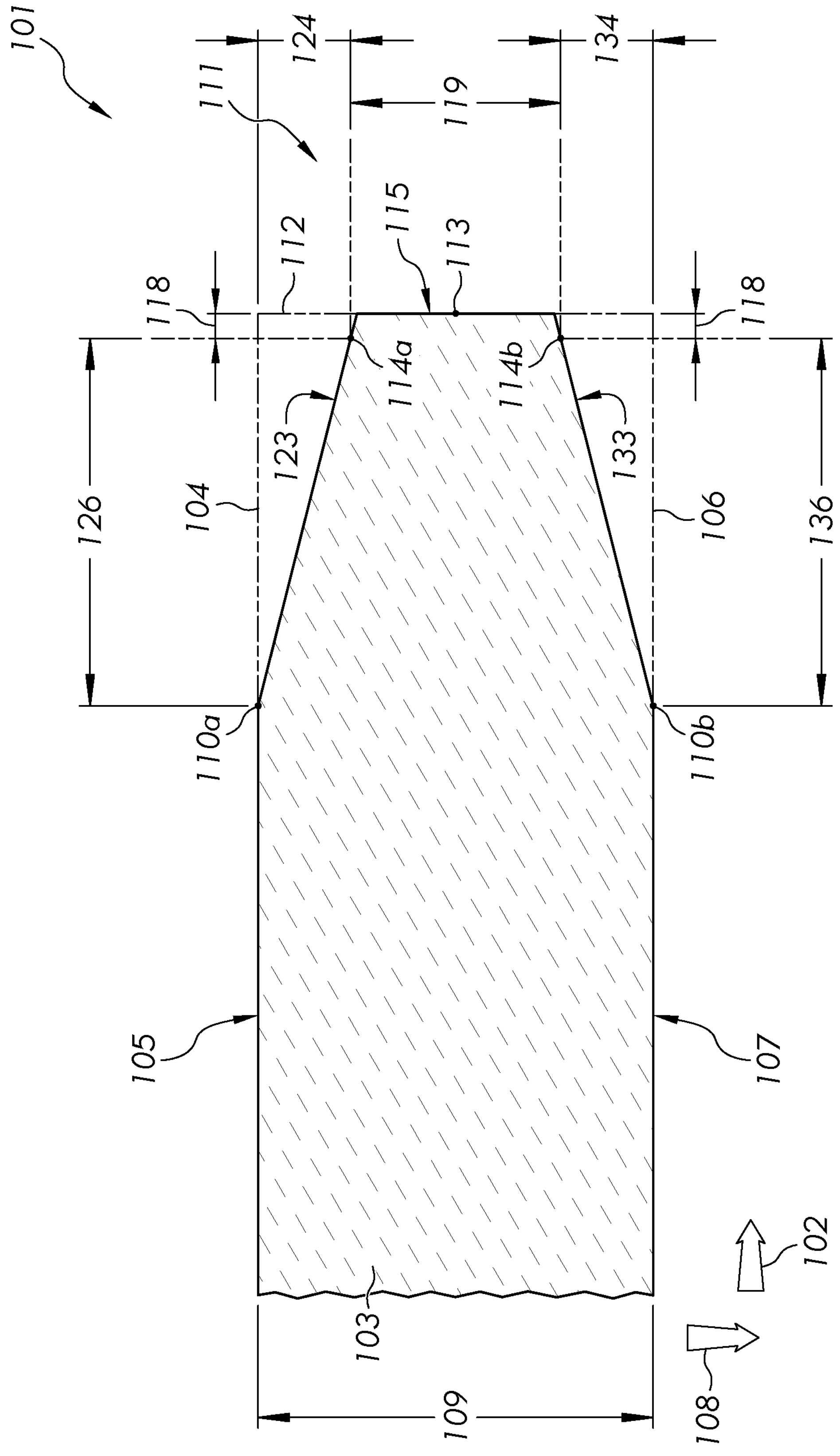
FIGS. 1-2 are schematic views of an example substrates according to aspects of the disclosure.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Aspects will now be described more fully hereinafter with reference to the accompanying drawings in which example aspects are shown. Whenever possible, the same reference numerals are used throughout the drawings to refer to the same or like parts.

The substrates of aspects of the disclosure will be discussed with reference to the substrate 101 and 201 shown in FIGS. 1-2. However, it is to be understood that substrates articles are not limited to such aspects and can be used in various applications. Unless otherwise noted, a discussion of features of aspects of one coating or coated article can apply equally to corresponding features of any aspect of the disclosure. For example, identical part numbers throughout the disclosure can indicate that, in some aspects, the identified features are identical to one another and that the discussion of the identified feature of one aspect, unless otherwise noted, can apply equally to the identified feature of any other aspect of the disclosure.

Figure 2:
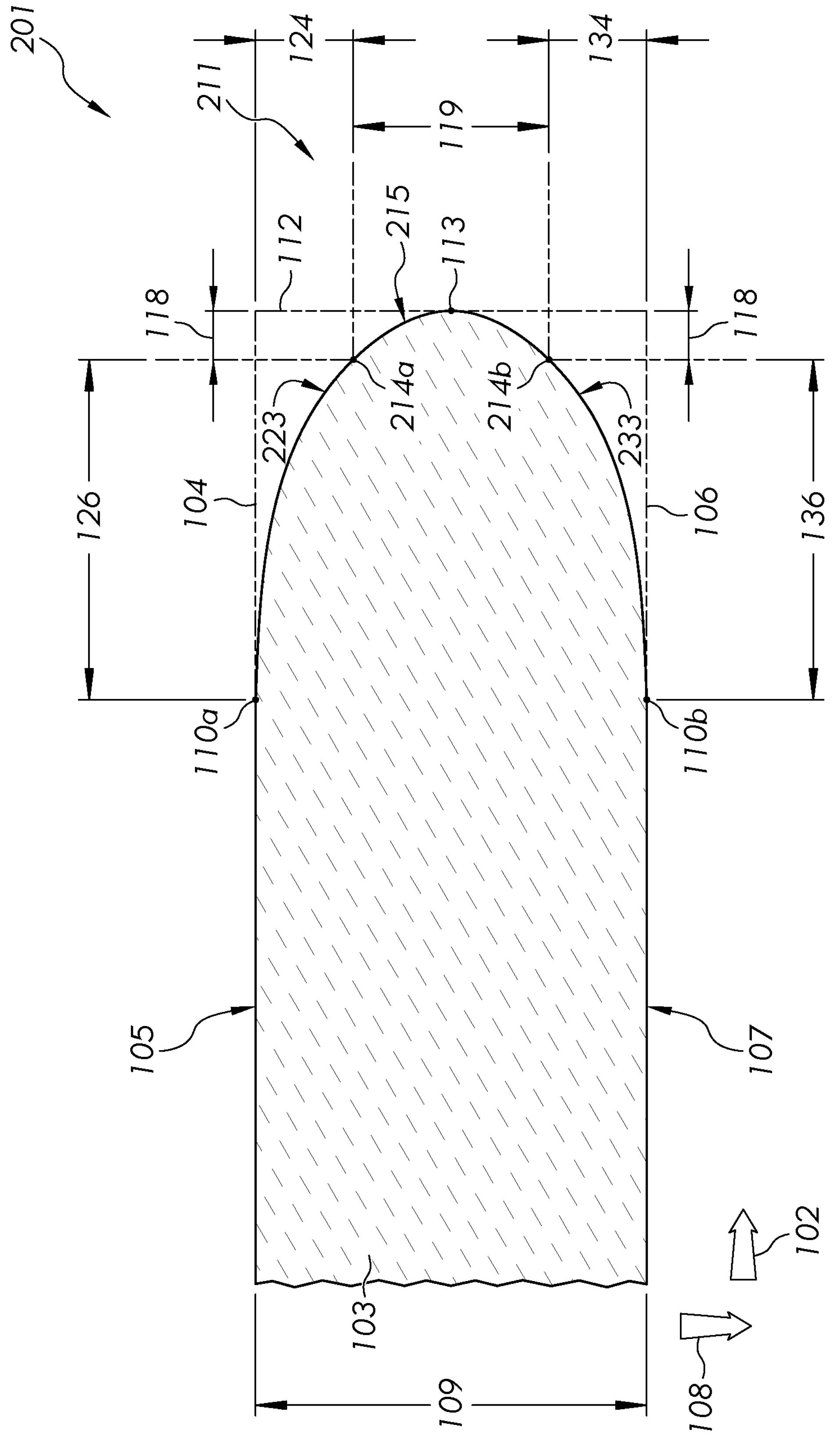

As shown in FIGS. 1-2, the substrate 101 and 201 comprises a substrate material 103 that can be a glass-based material and/or a ceramic-based material. As used herein, "glass-based" includes both glasses and glass-ceramics, wherein glass-ceramics have one or more crystalline phases and an amorphous, residual glass phase. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion exchange of larger ions for smaller ions in the surface of the substrate, as discussed below. However, other strengthening methods, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In aspects, glass-based material can comprise an alkali-containing glass or an alkali-free glass, either of which may be free of lithia or not. In aspects, the glass material can be alkali-free and/or comprise a low content of alkali metals (e.g., $R_2O$ of about 10 mol % or less, wherein $R_2O$ comprises $Li_2O$ $Na_2O$, $K_2O$, or the more expansive list provided below). In one or more aspects, a glass-based material may comprise, in mole percent (mol %): $SiO_2$ in a range from about 40 mol % to about 80%, $Al_2O_3$ in a range from about 5 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. "Glass-ceramics" include materials produced through controlled crystallization of glass. In aspects, glass-ceramics have about 1% to about 99% crystallinity. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, $ZnO{\times}Al_2O_3{\times}nSiO_2$ (i.e., ZAS system), and/or glass-ceramics that include a predominant crystal phase including β-quartz solid solution, β-spodumene, cordierite, petalite, and/or lithium disilicate. The glass-ceramic substrates may be strengthened using the chemical strengthening processes. In one or more aspects, MAS-System glass-ceramic substrates may be strengthened in $Li_2SO_4$ molten salt, whereby an exchange of $2Li^+$ for $Mg^{2+}$ can occur.

As used herein, "ceramic-based" includes both ceramics and glass-ceramics, wherein glass-ceramics have one or more crystalline phases and an amorphous, residual glass phase. Ceramic-based materials may be strengthened (e.g., chemically strengthened). In aspects, a ceramic-based material can be formed by heating a glass-based material to form ceramic (e.g., crystalline) portions. In further aspects, ceramic-based materials may comprise one or more nucleating agents that can facilitate the formation of crystalline phase(s). In aspects, ceramic-based materials can comprise one or more oxides, nitrides, oxynitrides, carbides, borides, and/or silicides. Example aspects of ceramic oxides include zirconia ($ZrO_2$), zircon ($ZrSiO_4$), an alkali metal oxide (e.g., sodium oxide ($Na_2O$)), an alkali earth metal oxide (e.g., magnesium oxide (MgO)), titania ($TiO_2$), hafnium oxide ($Hf_2O$), yttrium oxide ($Y_2O_3$), iron oxides, beryllium oxides, vanadium oxide ($VO_2$), fused quartz, mullite (a mineral comprising a combination of aluminum oxide and silicon dioxide), and spinel ($MgAl_2O_4$). Example aspects of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example aspects of oxynitride ceramics include silicon oxynitride, aluminum oxynitride, and a SiAlON (a combination of alumina and silicon nitride and can have a chemical formula, for example, $Si_{12-m-n}Al_{m+n}O_nN_{16-n}$, $Si_{6-n}Al_nO_nN_{8-n}$, or $Si_{2-n}Al_nO_{1+n}N_{2-n}$, where m, n, and the resulting subscripts are all non-negative integers). Example aspects of carbides and carbon-containing ceramics include silicon carbide (SiC), tungsten carbide (WC), an iron carbide, boron carbide ($B_4C$), alkali metal carbides (e.g., lithium carbide ($Li_4C_3$)), alkali earth metal carbides (e.g., magnesium carbide ($Mg_2C_3$)), and graphite. Example aspects of borides include chromium boride ($CrB_2$), molybdenum boride ($Mo_2B_5$), tungsten boride ($W_2B_5$), iron boride, titanium boride, zirconium boride ($ZrB_2$), hafnium boride ($HfB_2$), vanadium boride ($VB_2$), niobium boride ($NbB_2$), and lanthanum boride ($LaB_6$). Example aspects of silicides include molybdenum disilicide ($MoSi_2$), tungsten disilicide ($WSi_2$), titanium disilicide ($TiSi_2$), nickel silicide (NiSi), alkali earth silicide (e.g., sodium silicide (NaSi)), alkali metal silicide (e.g., magnesium silicide ($Mg_2Si$)), hafnium disilicide ($HfSi_2$), and platinum silicide (PtSi).

Throughout the disclosure, pencil hardness is measured using ASTM D 3363-20 with standard lead graded pencils. In aspects, the substrate 101 and/or 201 can have a pencil hardness of 8H or more, for example, 9H or more. Throughout the disclosure, an elastic modulus (e.g., Young's modulus) of the substrate 101 or 201 (e.g., substrate material 103 comprising a glass-based material or a ceramic-based material) is measured using indentation methods in accordance with ASTM E2546-In aspects, the substrate 101 or 201 (e.g., substrate material 103) comprising a glass-based material or a ceramic-based material can comprise an elastic modulus of about 10 GigaPascals (GPa) or more, about 50 GPa or more, about 60 GPa or more, about 70 GPa or more, about 100 GPa or less, or about 80 or less. In aspects, the substrate 101 or 201 (e.g., substrate material 103) comprising a glass-based material or a ceramic-based material can comprise an elastic modulus in a range from about 10 GPa to about 100 GPa, from about 50 GPa to about 100 GPa, from about 60 GPa to about 80 GPa, from about 70 GPa to about 80 GPa, or any range or subrange therebetween.

As shown in FIGS. 1-2, the substrate 101 or 201 can comprise a first major surface 105 and a second major surface 107 opposite the first major surface 105. As shown in FIGS. 1-2, the first major surface 105 can extend along a first plane 104. As further shown in FIGS. 1-2, the substrate 101 or 201 can comprise the second major surface 107 extending along a second plane 106. In aspects, as shown, the second plane 106 can be substantially parallel to the first plane 104. As used herein, a substrate thickness 109 can be defined between the first major surface 105 and the second major surface 107 as a distance between the first plane 104 and the second plane 106. In aspects, the substrate thickness 109 can extend in the thickness direction 108, which can be perpendicular to the first major surface 105. In aspects, the substrate thickness 109 can be about 25 micrometers (μm) or more, about 30 μm or more, about 40 μm or more, about 50 μm or more, about 60 μm or more, about 80 μm or more, about 100 μm or more, about 125 μm or more, about 150 μm or more, about 3 millimeters (mm) or less, about 2 mm or less, about 1 mm or less, about 800 μm or less, about 500 μm or less, about 300 μm or less, about 200 μm or less, about 180 μm or less, about 160 μm or less, about 100 μm or less, about 80 μm or less, about 35 μm or less, or about 30 μm or less. In aspects, the substrate thickness 109 can be in a range from about 25 μm to about 3 mm, from about 25 μm to about 2 mm, from about 30 μm to about 1 mm, from about 35 μm to about 800 μm, from about 40 μm to about 500 μm, from about 50 μm to about 300 μm, from about 60 μm to about 200 μm, from about 80 μm to about 160 μm, or any range or subrange therebetween. In further aspects, the substrate thickness 109 can be in a range from about 25 μm to about 35 μm, from about 25 μm to about 30 μm, from about 30 μm to about 35 μm, or any range or subrange therebetween. In further aspects, the substrate thickness 109 can be in a range from about 35 μm to about 3 mm, from about 35 μm to about 1 mm, from about 35 μm to about 500 μm, from about 35 μm to about 300 μm, from about μm to about 200 μm, from about 50 μm to about 200 μm, from about 50 μm to about 180 μm, from about 50 μm to about 160 μm, from about 50 μm to about 100 μm, from about 60 μm to about 100 μm, from about 80 μm to about 100 μm, or any range or subrange therebetween.

The substrate 101 and 201 comprises an edge surface 111 and 211 extending between and connecting the first major surface 105 and the second major surface 107. As shown in FIGS. 1-2, the edge surface 111 and 211 meets the first major surface 105 at point 110*a*, and the edge surface 111 and 211 meets the second major surface 107 at point 110*b*. In aspects, as shown in FIG. 1, the edge surface 111 can comprise a chamfer comprising one or more (e.g., three) substantially straight surfaces. In aspects, as shown in FIG. 2, the edge surface 211 can comprise a rounded (e.g., curved, curvilinear) edge surface. In further aspects, as shown in FIG. 2, the edge surface 211 can comprise a convex cross-section, although in other aspects the edge surface can comprise a concave cross-section. In aspects, a local thickness can decrease from the substrate thickness 109 to an edge thickness 119 of the outer peripheral surface 115 or 215 in the edge surface 111 and 211. In further aspects, as shown in FIGS. 1-2, a thickness of the edge surface 111 and 211 can smoothly decrease, monotonically decrease, and/or smoothly and monotonically decrease between the substrate thickness 109 and the edge thickness 119. As used herein, a thickness decreases smoothly if changes in the local thickness are smooth (e.g., gradual) rather than abrupt (e.g., step) changes in thickness. As used herein, a thickness decreases monotonically in a direction if the thickness decreases for a portion and for the rest of the time either stays the same, decreases, or a combination thereof (i.e., the thickness decreases but never increases in the direction). For example, as shown in FIGS. 1-2, the edge surface 111 and 211 smoothly and monotonically decreases in the first direction 102. Providing a smooth and/or monotonically decreasing can reduce stress concentrations on the edge surface (e.g., where the edge surface meets the first major surface or the second major surface), which can improve an edge strength and/or a bendability of the substrate.

The edge surface 111 and 211 comprises an outer peripheral point 113 that is a furthermost point in the first direction 102 perpendicular to the thickness direction 108. In aspects, as shown in FIG. 2, the outer peripheral point 113 can comprise a single point. In aspects, as shown in FIG. 1, the outer peripheral point 113 can comprise more than one point, for example an entire outer peripheral surface 115 (discussed below). An outer plane 112 extends in a direction (e.g., thickness direction 108) perpendicular to the first major surface 105 (e.g., first plane 104, first direction 102), and the outer plane 112 intersects the outer peripheral point 113. Throughout the disclosure, the outer peripheral surface 115 and 215 comprises a portion of the edge surface 111 and 211 within 5 μm (distance 118) of the outer plane 112, as shown in FIGS. 1-2. As used herein, "within 5 μm" includes all points that are from 0 μm to 5 μm from the reference location with this range including the endpoints. For example, as shown in FIGS. 1-2, the outer peripheral surface 115 and 215 comprises the portion of the edge surface 111 and 211 between points 114*a* and 114*b* or 214*a* and 214*b* that are 5 μm from the outer plane 112. Without wishing to be bound by theory, portions within 5 μm of the outer plane 112 can comprise a slope that is steeper in the thickness direction 108 than other portions of the edge surface 111 and 211 (e.g., comprising an absolute value of a tangential slope in the orientation shown in FIGS. 1-2 of 1 or more.

A first peripheral surface 123 and 223 extends between and connects the first major surface 105 and the outer peripheral surface 115 and 215 (i.e., point 114*a* or 214*a* that are 5 μm from the outer plane 112). As used herein, a first depth 124 of the first peripheral surface 123 and 223 is defined as a minimum distance between the outer peripheral surface 115 and 215 and the first plane 104 in the thickness direction 108. As shown in FIGS. 1-2, the first depth 124 corresponds to a distance in the thickness direction 108 between the point 114*a* or 214*a* and the first plane 104. In aspects, first depth 124 can be about 4 μm or more, about 6 μm or more, about 8 μm or more, about 12 μm or more, about 14 μm or more, about 16 μm or more, about 18 μm or more, about 24 μm or less, about 22 μm or less, about 20 μm or less, about 12 μm or less, about 10 μm or less, or about 9 μm or less. In aspects, the first depth 124 can be in a range from about 4 μm to about 24 μm, from about 6 μm to about 22 μm, from about 8 μm to about 20 μm, or any range or subrange therebetween. In aspects, when the substrate thickness 109 is about 35 μm or less, the first depth 124 can be in a range from about 4 μm to about 12 μm, from about 6 μm to about 10 μm, from about 8 μm to about 10 μm, from about 8 μm to about 9 μm, or any range or subrange therebetween. In aspects, when the substrate thickness 109 is about 35 μm or more, the first depth 124 can be in a range from about 14 μm to about 24 μm, from about 16 μm to about 22 μm, from about 18 μm to about 20 μm, or any range or subrange therebetween. In aspects, a ratio of the first depth 124 to the substrate thickness 109 can be about 0.1 or more, about 0.15 or more, about 0.2 or more, about 0.25 or more, about 0.28 or more, about 0.4 or less, about 0.35 or less, or about 0.32 or less. In aspects, the ratio of the first depth 124 to the substrate thickness 109 can be in a range from about 0.1 to about 0.4, from about 0.15 to about 0.4, from about 0.15 to about 0.35, from about 0.2 to about 0.35, from about 0.25 to about 0.35, from about 0.28 to about 0.32, or any range or subrange therebetween. Providing a ratio of the first depth to the substrate thickness of about 0.4 or less can avoid stress concentrations at the outer peripheral surface and/or relatively sharp edges at the outer peripheral surface by increasing an edge thickness (e.g., reducing stress concentrations where the first peripheral surface and/or the second peripheral surface meet the outer peripheral surface), which can improve an edge strength and/or a bendability of the substrate.

As used herein, a first width 126 of the first peripheral surface 123 and 223 is defined as a minimum distance between the outer peripheral surface 115 and 215 and the first major surface 105 along the first direction 102 that the first plane 104 extends along. As shown in FIGS. 1-2, the first width 126 corresponds to a distance in the first direction 102 between the point 114*a* or 214*a* and the point 110*a*. In aspects, the first width 126 can be about 30 μm or more, about 35 μm or more, about 38 μm or more, about 40 μm or more, about 45 μm or more, about 50 μm or more, about 55 μm or more, about 60 μm or less, about 55 μm or less, about 50 μm or less, about 45 μm or less, or about 42 μm or less. In aspects, the first width 126 can be in a range from about 30 μm to about 60 μm, from about 35 μm to about 60 μm, from about 38 μm to about 55 μm, from about 40 μm to about 50 μm, from about 40 μm to about 45 μm, or any range or subrange therebetween. In aspects, when the substrate thickness 109 is about 35 μm or less, the first width 126 can be in a range from about 30 μm to about 50 μm, from about 35 μm to about 45 μm, from about 38 μm to about 42 μm, or any range or subrange therebetween. In aspects, when the substrate thickness 109 is about 35 μm or more, the first width 126 can be in a range from about 40 μm to about 60 μm, from about 45 μm to about 60 μm, from about 45 μm to about 55 μm, from about 50 μm to about 55 μm, or any range or subrange therebetween.

In aspects, a ratio of the first width 126 to the substrate thickness 109 can be about 0.3 or more, about 0.5 or more, about 0.8 or more, about 1 or more, about 1.1 or more, about 1.2 or more, about 1.3 or more, about 1.6 or less, about 1.55 or less, or about 1.45 or less, or about 1.4 or less. In aspects, the ratio of the first width 126 to the substrate thickness 109 can be in a range from about 0.3 to about 1.6, from about 0.5 to about 1.6, from about 0.8 to about 1.6, from about 1 to about 1.6, from about 1 to about 1.55, from about 1.1 to about 1.55, from about 1.2 to about 1.45, from about 1.3 to about 1.4, or any range or subrange therebetween. In aspects, when the substrate thickness 109 is about 35 μm or less, the ratio of the first width 126 to the substrate thickness 109 can be in a range from about 1 to about 1.6, from about 1.1 to about 1.55, from about 1.2 to about 1.45, from about 1.3 to about 1.4, or any range or subrange therebetween. In aspects, when the substrate thickness 109 is about 35 μm or more, the ratio of the first width 126 to the substrate thickness 109 can be in a range from about 0.3 to about 1.6, from about 0.5 to about 1.55, from about 0.8 to about 1.55, from about 1 to about 1.55, from about 1.1 to about 1.55, from about 1.2 to about 1.45, from about 1.3 to about 1.4, or any range or subrange therebetween. Providing a ratio of the first width to the substrate thickness within one or more of the above-mentioned ranges can provide an angle (or slope) where the corresponding peripheral surface meets the corresponding major surface that reduces stress concentrations, which increases an edge strength and/or a bendability of the substrate.

In aspects, a ratio of the first width 126 to the first depth 124 can be about 2 or more, about 2.5 or more, about 2.7 or more, about 3 or more, about 4 or more, about 4.5 or more, about 4.8 or more, about 8 or less, about 7 or less, about 6 or less, about 5.5 or less, about 5.2 or less, about 5 or less, about 4 or less, about 3.5 or less, about 3 or less, or about 2.9 or less. In aspects, the ratio of the first width 126 to the first depth 124 can be in a range from about 2 to about 8, from about 2 to about 7, from about 2 to about 6, from about 3 to about 6, from about 4 to about 6, from about 4 to about 5.5, from about 4.5 to about 5.2, from about 4.8 to about 5, or any range or subrange therebetween. In aspects, when the substrate thickness 109 is about 35 μm or less, the ratio of the first width 126 to the first depth 124 can be in a range from about 4 to about 8, from about 4 to about 7, from about 4 to about 6, from about 4 to about 5.5, from about 4.5 to about 5.5, from about 4.8 to about 5.2, or any range or subrange therebetween. In aspects, for example when the substrate thickness 109 is about 35 μm or more, the ratio of the first width 126 to the first depth 124 can be in a range from about 2 to about 4, from about 2 to about 3.5, from about 2.5 to about 3, from about 2.7 to about 2.9, or any range or subrange therebetween. Providing a ratio of the first width to the first depth within one or more of the above-mentioned ranges can separate the intersection of the corresponding peripheral surface with the corresponding major surface and the interaction of the corresponding peripheral surface with the outer peripheral surface, which can improve the edge strength and/or bendability of the substrate. Providing a ratio of the first width to the first depth within one or more of the above-mentioned ranges can separate the intersection of the corresponding peripheral surface with the corresponding major surface and the interaction of the corresponding peripheral surface with the outer peripheral surface, which can improve the edge strength and/or bendability of the substrate.

In aspects, a second peripheral surface 133 and 233 extends between and connects the second major surface 107 and the outer peripheral surface 115 and 215 (i.e., point 114*b* or 214*b* that are 5 μm from the outer plane 112). As used herein, a second depth 134 of the second peripheral surface 133 and 233 is defined as a minimum distance between the outer peripheral surface 115 and 215 and the second plane 106 in the thickness direction 108. As shown in FIGS. 1-2, the second depth 134 corresponds to a distance in the thickness direction 108 between the point 114*b* or 214*b* and the second plane 106. In further aspects, second depth 134 can be within one or more of the ranges discussed above for the first depth 124. In even further aspects, the second depth 134 can be substantially equal to the first depth 124. In further aspects, a ratio of the second depth 134 to the substrate thickness 109 can be within one or more of the ranges discussed above for the ratio of the first depth 124 to the substrate thickness 109. In further aspects, when the substrate thickness 109 is about 35 μm or less or when the substrate thickness 109 is about 35 μm or more, the ratio of the second depth 134 to the substrate thickness 109 can be within one or more of the corresponding ranges discussed above for the ratio of the first depth 124 to the substrate thickness 109. In further aspects, the ratio of the second depth 134 to the substrate thickness 109 can be substantially equal to the ratio of the first depth 124 to the substrate thickness 109.

As used herein, a second width 136 of the second peripheral surface 133 and 233 is defined as a minimum distance between the outer peripheral surface 115 and 215 and the second major surface 107 along the first direction 102 that the second plane 106 extends along. As shown in FIGS. 1-2, the second width 136 corresponds to a distance in the first direction 102 between the point 114*b* or 214*b* and the point 110*b*. In aspects, the second width 136 can be within one or more of the ranges discussed above for the first width 126. In further aspects, the second width 136 can be substantially equal to the first width 126. In further aspects, when the substrate thickness 109 is about 35 μm or less or when the substrate thickness 109 is about 35 μm or more, the second width 136 can be within one or more of the corresponding ranges discussed above for the first width 126.

In aspects, a ratio of the second width 136 to the substrate thickness 109 can be within one or more of the ranges discussed above for the ratio of the first width 126 to the substrate thickness 109. In further aspects, the ratio of the second width 136 to the substrate thickness 109 can be substantially equal to the ratio of the first width 126 to the substrate thickness 109. In further aspects, when the substrate thickness 109 is about 35 μm or less or when the substrate thickness 109 is about 35 μm or more, the ratio of the second width 136 to the substrate thickness 109 can be within one or more of the corresponding ranges discussed above for the ratio of the first width 126 to the substrate thickness 109.

In aspects, a ratio of the second width 136 to the second depth 134 can be within one or more of the ranges discussed above for the ratio of the first width 126 to the first depth 124. In further aspects, the ratio of the second width 136 to the second depth 134 can be substantially equal to the ratio of the first width 126 to the first depth 124. In further aspects, when the substrate thickness 109 is about 35 μm or less or when the substrate thickness 109 is about 35 μm or more, the ratio of the second width 136 to the second depth 134 can be within one or more of the corresponding ranges discussed above for the ratio of the first width 126 to the first depth 124.

In aspects, although not shown, it is to be understood that the substrate can comprise a second edge surface opposite the edge surface 111 or 211 shown in FIGS. 1-2. In further aspects, the second edge surface can comprise a third peripheral surface extending between and connecting the first major surface to a second outer peripheral surface, and/or the second edge surface can comprise a fourth peripheral surface extending between and connecting the second major surface to the second outer peripheral surface. In even further aspects, the third peripheral surface and/or the fourth peripheral surface can comprise a corresponding width and a corresponding depth that can be within one or more of the corresponding ranges discussed above for the first edge surface. In still further aspects, the width and/or the depth of the third peripheral surface can be substantially equal to the corresponding width and/or depth of the first peripheral surface. In still further aspects, the width and/or the depth of the fourth peripheral surface can be substantially equal to the corresponding width and/or depth of the second peripheral surface. In even further aspects, a ratio of the width to the substrate thickness, a ratio of the depth to the substrate thickness, and/or a ratio of the width to the depth of the third peripheral surface and/or the fourth peripheral surface can be within the one or more of the ranges discussed above for the corresponding ratio of the features of the first peripheral surface.

In aspects, the substrate 101 or 201 (e.g., substrate material 103) may comprise a glass-based substrate and/or ceramic-based substrate where one or more portions of the substrate may comprise a compressive stress region. In aspects, the compressive stress region may be created by chemically strengthening the substrate. Chemically strengthening may comprise an ion exchange process, where ions in a surface layer are replaced by—or exchanged with—larger ions having the same valence or oxidation state. Without wishing to be bound by theory, chemically strengthening the substrate can enable small (e.g., smaller than about 10 mm or less) parallel plate distances because the compressive stress from the chemical strengthening can counteract the bend-induced tensile stress on the outermost surface of the substrate (e.g., first major surface 105 in FIGS. 1-2). A compressive stress region may extend into a portion of the substrate for a depth called the depth of compression. As used herein, depth of compression means the depth at which the stress in the chemically strengthened substrates described herein changes from compressive stress to tensile stress. Depth of compression may be measured by a surface stress meter or a scattered light polariscope (SCALP, wherein values reported herein were made using SCALP-5 made by Glasstress Co., Estonia) depending on the ion exchange treatment and the thickness of the article being measured. Where the stress in the substrate is generated by exchanging potassium ions into the substrate, a surface stress meter, for example, the FSM-6000 (Orihara Industrial Co., Ltd. (Japan)), is used to measure a depth of compression. Unless specified otherwise, compressive stress (including surface CS) is measured by surface stress meter (FSM) using commercially available instruments, for example, the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the substrate, and the article being measured is thicker than about 75 μm, SCALP is used to measure the depth of compression and central tension (CT). Where the stress in the substrate is generated by exchanging both potassium and sodium ions into the glass, and the article being measured is thicker than about 75 μm, the depth of compression and CT are measured by SCALP. Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample", which is incorporated herein by reference in its entirety) method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement. As used herein, "depth of layer" (DOL) means the depth that the ions have exchanged into the substrate (e.g., sodium, potassium). Through the disclosure, when the central tension cannot be measured directly by SCALP (as when the article being measured is thinner than about 75 μm) the maximum central tension can be approximated by a product of a maximum compressive stress and a depth of compression divided by the difference between the thickness of the substrate and twice the depth of compression, wherein the compressive stress and depth of compression are measured by FSM.

In aspects, the substrate 101 or 201 may be chemically strengthened to form a first compressive stress region extending to a first depth of compression from the first major surface 105. In aspects, the substrate 101 or 201 may be chemically strengthened to form a second compressive stress region extending to a second depth of compression from the second major surface 107. In further aspects, the first compressive stress region and/or the second compressive stress region can comprise a plurality of ion-exchanged metal ions producing compressive stress in the corresponding compressive stress region. In further aspects, the first depth of compression (e.g., from the first major surface 105) and/or second depth of compression (e.g., from the second major surface 107) as a percentage of the substrate thickness 109 can be about 1% or more, about 5% or more, about 10% or more, about 30% or less, about 25% or less, or about 20% or less. In further aspects, the first depth of compression and/or the second depth of compression as a percentage of the substrate thickness 109 can be in a range from about 1% to about 30%, from about 5% to about 25%, from about 10% to about 20%, or any range or subrange therebetween. In aspects, the first depth of compression and/or the second depth of compression can be about 1 μm or more, about 3 μm or more, about 10 μm or more, about 30 μm or more, about 50 μm or more, about 200 μm or less, about 150 μm or less, about 100 μm or less, about 80 μm or less, or about 65 μm or less. In aspects, the first depth of compression and/or the second depth of compression can be in a range from about 1 μm to about 200 μm, from about 3 μm to about 150 μm, from about 10 μm to about 100 μm, from about 30 μm to about 80 μm, from about 50 μm to about μm, or any range or subrange therebetween. In aspects, the first depth of compression can be greater than, less than, or substantially the same as the second depth of compression. By providing a glass-based substrate and/or a ceramic-based substrate comprising a first depth of compression and/or a second depth of compression in a range from about 1% to about 30% of the substrate thickness, good impact and/or puncture resistance can be enabled.

In aspects, the substrate 101 or 201 can comprise a first depth of layer of one or more alkali metal ions associated with the first compressive stress region and/or a second depth of layer of one or more alkali metal ions associated with the second compressive stress region. In aspects, the first depth of layer and/or second depth of layer as a percentage of the substrate thickness 109 can be about 1% or more, about 5% or more, about 10% or more, about 15% or more, about 20% or more, about 35% or less, about 30% or less, about 25% or less, or about 22% or less. In aspects, the first depth of layer and/or second depth of layer as a percentage of the substrate thickness 109 can be in a range from about 1% to about 35%, from about 5% to about 30%, from about 10% to about 25%, from about 15% to about 22%, from about 20% to about 22%, or any range or subrange therebetween. In aspects, the first depth of layer and/or second depth of layer can be about 1 μm or more, about 3 μm or more, about 10 μm or more, about 30 μm or more, about 50 μm or more, about 200 μm or less, about 150 μm or less, about 100 μm or less, about 80 μm or less, or about 65 μm or less. In aspects, the first depth of layer and/or second depth of layer can be in a range from about 1 μm to about 200 μm, from about 3 μm to about 150 μm, from about 10 μm to about 100 μm, from about 30 μm to about 80 μm, from about 50 μm to about 65 μm, or any range or subrange therebetween. By providing a glass-based substrate and/or a ceramic-based substrate comprising a first depth of layer and/or a second depth of layer in a range from about 1% to about 30% of the substrate thickness, good impact and/or puncture resistance can be enabled.

In aspects, the first compressive stress region can comprise a maximum first compressive stress. In aspects, the second compressive stress region can comprise a maximum second compressive stress. In further aspects, the maximum first compressive stress and/or the maximum second compressive stress can be about 400 MegaPascals (MPa), about 500 MPa or more, about 700 MPa or more, about 1,500 MPa or less, about 1,200 MPa or less, about 1,000 MPa or less, or about 900 MPa or less. In further aspects, the maximum first compressive stress and/or the maximum second compressive stress can be in a range from about 400 MPa to about 1,500 MPa, from about 400 MPa to about 1,200 MPa, from about 500 MPa to about 1,000 MPa, from about 700 MPa to about 900 MPa, or any range or subrange therebetween. In aspects, the maximum first compressive stress can be substantially equal to the maximum second compressive stress. Providing a maximum first compressive stress and/or a maximum second compressive stress in a range from about 400 MPa to about 1,500 MPa can enable good impact and/or puncture resistance.

In aspects, the substrate can comprise a central tension region positioned between the first compressive stress region and the second compressive stress region. In further aspects, the central tension region can comprise a maximum central tensile stress. In aspects, the maximum central tensile stress can be about 50 MPa or more, about 100 MPa or more, about 200 MPa or more, about 250 MPa or more, about 750 MPa or less, about 600 MPa or less, about 500 MPa or less, about 450 MPa or less, about 400 MPa or less, about 350 MPa or less, or about 300 MPa or less. In aspects, the maximum central tensile stress can be in a range from about 50 MPa to about 750 MPa, from about 50 MPa to about 600 MPa, from about 100 MPa to about 600 MPa, from about 100 MPa to about 500 MPa, from about 200 MPa to about 500 MPa, from about 200 MPa to about 450 MPa, from about 250 MPa to about 450 MPa, from about 250 MPa to about 350 MPa, from about 250 MPa to about 300 MPa, or any range or subrange therebetween.

In aspects, the substrate can comprise an edge compressive stress region extending to an edge depth of compression from the edge surface and/or an edge depth of layer of one or more alkali metal ions associated with the edge compressive stress region. In further aspects, the edge depth of compression (as a percentage or as an absolute distance) can be within one or more of the ranges discussed above for the first depth of compression. In further aspects, the edge depth of compression (as a percentage or as an absolute distance) can be substantially equal to or less than the first depth of compression. In further aspects, the edge depth of layer (as a percentage or as an absolute distance) can be within one or more of the ranges discussed above for the first depth of layer. In further aspects, the edge depth of layer (as a percentage or as an absolute distance) can be substantially equal to or less than the first depth of layer. In further aspects, the edge compressive stress layer can comprise a maximum edge compressive stress, which can be within one or more of the ranges discussed above for the maximum first compressive stress. In even further aspects, the maximum edge compressive stress can be substantially equal to the maximum first compressive stress. Providing an edge compressive stress can further improve the edge strength and/or bendability of the substrate.

As used herein, "edge strength" is measured using a "Two Point Bend test" described in the Society for Information Display (SID) 2011 Digest, pages 652-654, in a paper entitled "Two Point Bending of Thin Glass Substrate" by S. T. Gulati, J. Westbrook, S. Carley, H. Vepakomma, and T. Ono. As described in that document and shown in FIG. 5, the substrate 101 or 201 is placed between a pair of parallel rigid stainless-steel plates 503 and 505 of a parallel plate apparatus 501 with the second major surface 107 of the substrate 101 or 201 contacts each plate 503 and 505, and the distance between parallel is decreased until the substrate fails at a parallel plate distance 507 (D). The edge strength a is calculated as $\sigma=1.198\ Et/(D-t)$, where E is the elastic modulus of the substrate material and t is the substrate thickness. During the Two Point Bend test, the environment was controlled at 50% relative humidity and 25° C., and the parallel plate distance 507 was decreased at a rate of 50 μm/second. As used herein, the terms "fail," "failure" and the like refer to breakage, destruction, delamination, or crack propagation. Throughout the disclosure, the "B10 edge strength" of the substrate is the mean stress of failure of the substrate where 10% of the samples are expected to fail, and the "median edge strength" of the substrate is the mean stress of failure of the substrate where 50% of the samples are expected to fail. In aspects, the B10 edge strength of the substrate can be about 1000 MPa or more, about 1100 MPa or more, about 1200 MPa or more, about 1300 MPa or more, about 1400 MPa or more, about 1500 MPa or more, about 2000 MPa or less, or about 1700 MPa or less. In aspects, the B10 edge strength of the substrate can be in a range from about 1000 MPa to about 2000 MPa, from about 1100 MPa to about 1800 MPa, from about 1200 MPa to about 1700 MPa, from about 1300 MPa to about 1700 MPa, from about 1400 MPa to about 1600 MPa, or any range or subrange therebetween. In aspects, the median edge strength of the substrate can be about 1700 MPa or more, about 1900 MPa or more, about 2000 MPa or more, about 2200 MPa or more, about 2300 MPa or more, about 2700 MPa or less, about 2500 MPa or less, about 2450 MPa or less, about 2400 MPa or less, or about 2350 MPa or less. In aspects, the median edge strength of the substrate can be in a range from about 1700 MPa to about 2700 MPa, from about 1900 MPa to about 2500 MPa, from about 2000 MPa to about 2450 MPa, from about 2200 MPa to about 2400 MPa, from about 2300 MPa to about 2350 MPa, or any range or subrange therebetween.

Figure 5:
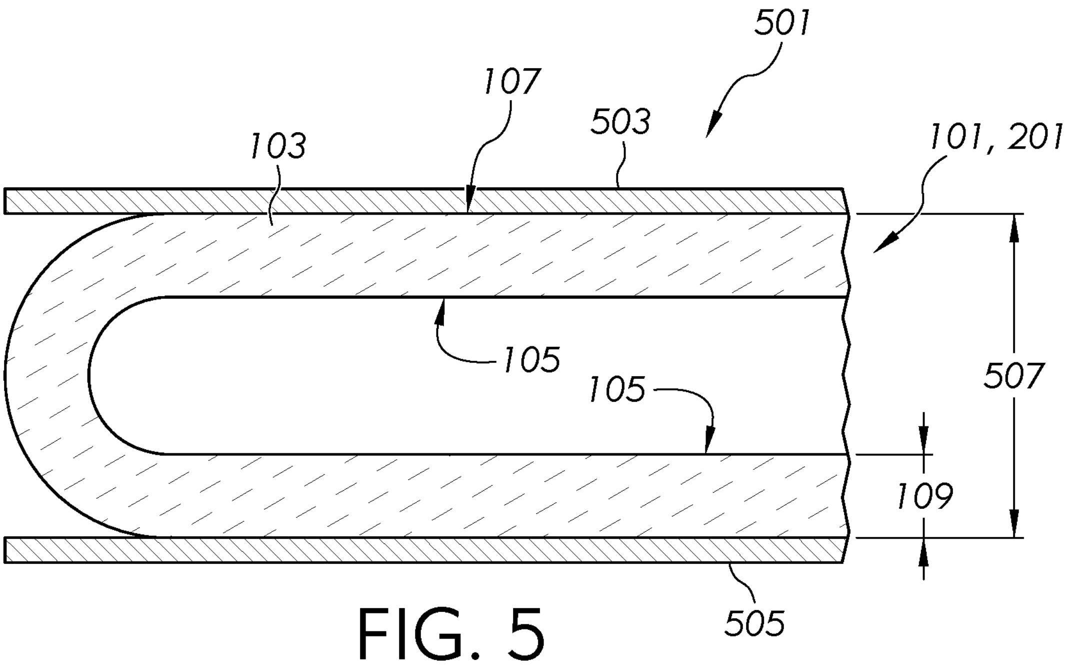
FIG. 5 is a schematic cross-sectional view of a parallel plate apparatus.

The parallel plate apparatus 501 shown in FIG. 5 can also be used to determine a parallel plate distance (e.g., minimum parallel plate distance) using a Parallel Plate Test. As used herein, a substrate 101 or 201 achieves a parallel plate distance of "X" or has a parallel plate distance of "X" if it resists failure when the substrate is held at a parallel plate distance of "X" for 24 hours at about 60° C. and about 90% relative humidity. As with the Two Point Bend test, as shown in FIG. 5, the substrate 101 or 201 is placed between a pair of parallel rigid stainless-steel plates 503 and 505 of a parallel plate apparatus 501 with the second major surface 107 of the substrate 101 or 201 contacts each plate 503 and 505. In the Parallel Plate Test, the parallel plate distance 507 is decreased at a rate of 50 μm/second until the parallel plate distance 507 is equal to the "parallel plate distance" to be tested. Then, the parallel plates are held at the parallel plate distance to be tested for 24 hours at about and about 90% relative humidity. As used herein, the minimum parallel plate distance is the smallest parallel plate distance that the substrate 101 or 201 can withstand without failure under the conditions and configuration described above.

In aspects, the substrate 101 or 201 can achieve a parallel plate distance of 10 mm or less, 9 mm or less, 8 mm or less, 7 mm or less, about 6 mm or less, about 5 mm or less, about 4 mm or less, about 3 mm or less, or about 2 mm or less. For example, the substrate 101 or 201 can achieve a parallel plate distance of 10 mm, or 9 mm, or 8 mm, or 7 mm, or 6 mm, or 5 mm, or 4 mm, or 3 mm, or 2 mm, or 1 mm. In aspects, the substrate 101 or 201 can achieve a parallel plate distance in a range from about 1 mm to about 10 mm, from about 1 mm to about 8 mm, from about 2 mm to about 7 mm, from about 2 mm to about 6 mm, from about 2 mm to about 5 mm, from about 3 mm to about 5 mm, or any range or subrange therebetween. In aspects, the substrate 101 or 201 can comprise a minimum parallel plate distance of about 10 mm or less, 9 mm or less, 8 mm or less, 7 mm or less, about 6 mm or less, about 5 mm or less, about 4 mm or less, about 3 mm or less, or about 2 mm or less. In aspects, the substrate 101 or 201 can comprise a minimum parallel plate distance in a range from about 1 mm to about 10 mm, from about 2 mm to about 7 mm, from about 3 mm to about 6 mm, from about 4 mm to about 5 mm, or any range or subrange therebetween.

In aspects, the substrate can comprise an optional coating comprising one or more of an easy-to-clean coating, a low-friction coating, an oleophobic coating, a diamond-like coating, a scratch-resistant coating, or an abrasion-resistant coating disposed on the first major surface and/or the second major surface. A scratch-resistant coating may comprise an oxynitride, for example, aluminum oxynitride or silicon oxynitride with a thickness of about 500 micrometers or more. In such aspects, the abrasion-resistant layer may comprise the same material as the scratch-resistant layer. In aspects, a low friction coating may comprise a highly fluorinated silane coupling agent, for example, an alkyl fluorosilane with oxymethyl groups pendant on the silicon atom. In such aspects, an easy-to-clean coating may comprise the same material as the low friction coating. In other aspects, the easy-to-clean coating may comprise a protonatable group, for example, an amine, for example, an alkyl aminosilane with oxymethyl groups pendant on the silicon atom. In such aspects, the oleophobic coating may comprise the same material as the easy-to-clean coating. In aspects, a diamond-like coating comprises carbon and may be created by applying a high voltage potential in the presence of a hydrocarbon plasma.

Aspects of the disclosure can comprise a consumer electronic product. The consumer electronic product can comprise a front surface, a back surface, and side surfaces. The consumer electronic product can further comprise electrical components at least partially within the housing. The electrical components can comprise a controller, a memory, and a display. The display can be at or adjacent the front surface of the housing. The consumer electronic product can comprise a cover substrate disposed over the display. In aspects, at least one of a portion of the housing or the cover substrate comprises the coated article discussed throughout the disclosure. The display can comprise a liquid crystal display (LCD), an electrophoretic displays (EPD), an organic light-emitting diode (OLED) display, or a plasma display panel (PDP). In aspects, the consumer electronic product can be a portable electronic device, for example, a smartphone, a tablet, a wearable device, or a laptop.

Figure 3:
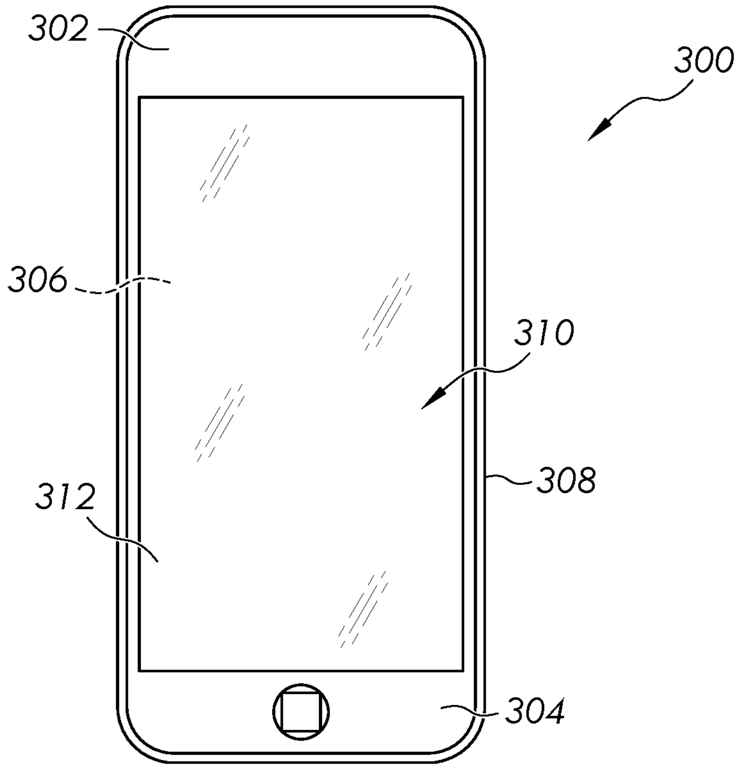
FIG. 3 is a schematic plan view of an example consumer electronic device according to aspects.
Figure 4:
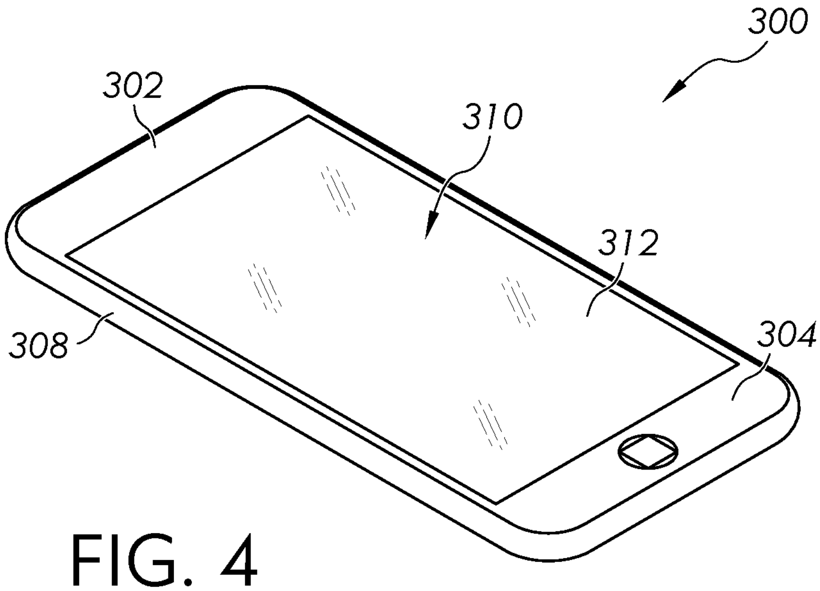
FIG. 4 is a schematic perspective view of the example consumer electronic device of FIG. 3.

The coated article and/or coating disclosed herein may be incorporated into another article, for example, an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion-resistance or a combination thereof. An exemplary article incorporating any of the coated articles disclosed herein is shown in FIGS. 3 and 4. Specifically, FIGS. 3 and 4 show a consumer electronic device 300 including a housing 302 having a front surface 304, a back surface 306, and side surfaces 308. The consumer electronic device 300 can comprise electrical components (not shown) that are at least partially inside or entirely within the housing and including at least a controller, a memory, and a display 310 at or adjacent to the front surface of the housing. The consumer electronic device 300 can comprise a cover substrate 312 at or over the front surface of the housing such that it is over the display. In aspects, at least one of the cover substrate 312 or a portion of housing 302 may include any of the coated article disclosed herein.

EXAMPLES

Various aspects will be further clarified by the following examples. Table 1 presents information about Examples A-E and Comparative Examples AA-FF. Unless otherwise specified, the substrate of Examples A-E and Comparative Examples AA-FF is a glass-based material (having a Composition 1 of, nominally, in mol % of: 69.1 $SiO_2$; 10.2 $Al_2O_3$; 15.1 $Na_2O$; 0.01 $K_2O$; 5.5 MgO; 0.09 $SnO_2$) resembling the substrate 101 or 201 shown in FIGS. 1-2. Examples A-B and AA-CC were chemically strengthened by immersing the substrate in a molten salt solution maintained at 400° C. comprising 100 wt % $KNO_3$ for 12 minutes. Example C and Comparative Example DD were chemically strengthened by immersing the substrate in a molten salt solution maintained at 420° C. comprising 100 wt % $KNO_3$ for 17 minutes. Example E and comparative Example FF were chemically strengthened by immersing the substrate in a molten salt solution maintained at 420° C. comprising 100 wt % $KNO_3$ for 30 minutes. Example D and Comparative Example EE were chemically strengthened by immersing the substrate in a molten salt solution maintained at 420° C. comprising 100 wt % $KNO_3$ for 35 minutes.

Table 1 presents the substrate thickness ("thickness"), the first depth ("depth") of the first peripheral surface, and the first width ("width") of the first peripheral surface. In Examples A-E and Comparative Examples AA-EE, the second peripheral surface was identical to the first peripheral surface. The minimum parallel plate distance reported in Table 10 is the median minimum parallel plate distance of the sample substrates tested for that Example. In Table 1, "W/t" refers to the ratio of the first width to the substrate thickness, "W/D" refers to the ratio of the first width to the first depth, and "D/t" refers to the ratio of the first depth to the substrate thickness.

TABLE 1

Properties of Examples A-D and Comparative Examples AA-EE

| Example | A | B | C | D | E | AA | BB | CC | DD | EE | FF |
|---|---|---|---|---|---|---|---|---|---|---|---|
| Thickness (μm) | 30 | 30 | 51 | 102 | 78 | 30 | 31 | 31 | 49 | 103 | 76 |
| Depth (μm) | 8.2 | 9.0 | 17.5 | 18.3 | 13.7 | 0 | 15.3 | 15.5 | 16.6 | 12.4 | 17.0 |
| Width (μm) | 34.4 | 46.6 | 45.1 | 53.6 | 55.5 | 0 | 43.7 | 45.4 | 93.2 | 47.5 | 62.4 |
| W/t | 1.15 | 1.55 | 0.88 | 0.53 | 0.71 | 0 | 1.11 | 1.50 | 1.90 | 0.46 | 0.82 |
| W/D | 4.19 | 5.18 | 2.58 | 2.92 | 4.05 | n/a | 4.19 | 5.18 | 5.62 | 3.84 | 3.67 |
| D/t | 0.27 | 0.30 | 0.34 | 0.18 | 0.18 | 0 | 0.49 | 0.50 | 0.34 | 0.12 | 0.22 |
| Maximum Compressive Stress (MPa) | 960 | 960 | 680 | 690 | 695 | 960 | 960 | 960 | 680 | 690 | 700 |
| Depth of Layer (μm) | 7.4 | 7.4 | 10.3 | 21.4 | 15.5 | 7.4 | 7.4 | 7.4 | 10.3 | 21.4 | 15.0 |
| B10 Edge Strength (MPa) | 1603 | 1690 | 1579 | 1253 | 1377 | 851 | 730 | 783 | 949 | 877 | 677 |
| Median Edge Strength (MPa) | 2371 | 2238 | 2459 | 1955 | 2228 | 970 | 1405 | 1333 | 1532 | 1520 | 1342 |
| Minimum Parallel Plate Distance (mm) | 1.5 | 1.3 | 1.7 | 2.0 | 3.6 | — | 1.9 | 1.9 | 2.7 | 4.5 | 3.3 |

Examples A-B and Comparative Examples AA-CC comprised a substrate thickness in a range from about 25 μm to about 35 μm. Comparative Example AA did not comprise any peripheral surface with substantially right angles at the edge of the substrate, and Comparative Example comprised a B10 edge strength of 851 MPa. Comparative Examples BB-CC comprised a first depth greater than 12 μm (i.e., about 15 μm) and a ratio of the first depth of the substrate thickness (D/t) greater than 0.4 (i.e., about 0.5). Comparative Examples BB-CC comprised a B10 edge strength of 730 MPa and 783 MPa, respectively, which is lower than the B10 edge strength of Example AA. Consequently, providing a first depth greater than 12 μm (with a substrate thickness from about 25 μm to about 35 μm) and/or a ratio of the first depth of the substrate thickness (D/t) greater than 0.4 impairs edge strength.

Examples A-B comprised a first depth from about 6 μm to about 12 μm (e.g., from about 8 μm to about 10 μm, from about 8 μm to about 9 μm), a first width from about 30 μm to about 50 μm, a ratio of the first width to the substrate thickness from about 1 to about 1.6 (e.g., from about 1.1 to about 1.55), a ratio of the first width to the first depth from about 4 to 8 (e.g., from about 4 to 6, from about 4 to about 5.5), and a ratio of the first depth to the substrate thickness from about 0.15 to about 0.4 (e.g., from about 0.25 to about 0.35). Examples A-B comprised a B10 edge strength of 1603 MPa and 1690 MPa (e.g., about 1000 MPa or more, from about 1200 MPa to about 1700 MPa, from about 1500 MPa to about 1700 MPa), respectively. Examples A-B comprised a median edge strength of 2371 MPa and 2238 MPa (e.g., about 1700 MPa or more, from about 1900 MPa to about 2500 MPa, from about 2200 MPa to about 2400 MPa), respectively. Compared to Comparative Examples AA-CC, Examples A-B unexpectedly increases the edge strength (e.g., B10 edge strength, median edge strength). For example, Examples A-B increase the B10 edge strength relative to Example AA by 88% and 99%, respectively.

Examples C-E and Comparative Examples DD-FF comprised a substrate thickness of about 35 μm or more (e.g., from about 35 μm to about 300 μm, from about 50 μm to about 200 μm, from about 50 μm to about 100 μm). Comparative Example DD comprised a first width of 93.2 μm, which is greater than about 65 μm; Comparative Example DD comprised a ratio of the first width to the substrate thickness of 1.90, which is greater than about 1.6; and Comparative Example DD comprised a ratio of the first width to the first depth of 5.62, which is greater than about 4. Comparative Example EE comprised a first depth of 12.4 μm, which is less than about 14 μm; and Comparative Example EE comprised a ratio of the first depth to the substrate thickness of 0.12, which is less than about 0.15.

Comparative Examples DD-EE comprised a B10 edge strength of 949 MPa and 877 MPa, respectively, which is less than about 1000 MPa. Compared to Comparative Examples AA-CC, the B10 edge strength of Comparative Examples DD-EE is slightly increased, but it is still qualitatively different from the B10 edge strength of Examples A-B or Examples C-E (discussed below).

Examples C-E comprised a first depth from about 14 μm to about 24 μm, a first width from about 40 μm to about 60 μm (e.g., from about 45 μm to about 55 μm), a ratio of the first width to the substrate thickness from about 0.3 to about 1.6 (e.g., from about 0.5 to about 1.55), a ratio of the first width to the first depth is in a range from about 2 to about 4, and a ratio of the first depth to the substrate thickness is in a range from about 0.15 to about 0.4 (e.g., from about 0.15 to about 0.35). Examples C-E comprised a B10 edge strength of 1579 MPa, 1253 MPa, and 1377 MPa (e.g., about 1000 MPa or more, from about 1200 MPa to about 1700 MPa, from about 1300 MPa to about 1600 μm), respectively. Examples C-E comprised a median edge strength of about 2459 MPa, 1955 MPa, and 2228 MPa (e.g., about 1700 MPa or more, from about 1900 MPa to about 2500 MPa), respectively. Compared to Comparative Examples AA-EE, Examples C-E unexpectedly increases the edge strength (e.g., B10 edge strength, median edge strength). For example, Examples C-E increase the B10 edge strength relative to Example AA by 86%, 47%, and 62%, respectively. For example, Examples C-E increase the B10 edge strength relative to Example EE by 80%, 43%, and 57%, respectively.

Comparative Example FF is similar to Example E (with the increased first depth and increased first width greater than 60 μm), but Example FF comprises substantially straight sides like the substrate 101 in FIG. 1 while Example E comprises a curved edge surface like the substrate 201 shown in FIG. 2. The B10 edge strength of Comparative Example FF is 698 MPa, which is lower than any of Comparative Examples AA-EE. In contrast, the B10 edge strength of Example E is greater than the B10 edge strength of Comparative Example by more than 100%. Without wishing to be bound by theory, it is believed that the decreased first width (of Example E relative to Comparative Example FF) and the curved edge surface (of Example E relative to than the straight edges of Comparative Example FF) each provide increases to the edge strength (e.g., B10 edge strength, median edge strength) that provide a synergistic benefit to provide the benefits seen.

The above observations can be combined to provide substrates comprising an edge surface between a first major surface and a second major surface, where dimensions (e.g., first width, second width, first depth, second depth, ratios thereof, and ratios relative to the substrate thickness) of a first peripheral surface between an outer peripheral surface of the edge surface and the first major surface and/or a second peripheral surface between the outer peripheral surface and the second major surface can reduce damage to the substrate, simplify handling of the substrate, and/or improve the edge strength of the substrate without impairing subsequent processing of the substrate (e.g., coating).

Damage to the substrate can be reduced by avoiding stress concentrations (e.g., from sharp corners). For example, the first peripheral surface and/or the second peripheral surface take the place of sharp corners between the first major surface and an initial edge surface. Likewise, providing a ratio of the first width to the first depth and/or a ratio of the second width to the second depth in a range from about 2 to about 8 (e.g., from about 2 to about 4, from about 4 to about 8, from about 4 to about 6, from about 4 to about 5.5) can provide an angle where the corresponding peripheral surface meets the corresponding major surface that reduces stress concentrations. Also, providing a ratio of the first depth and/or the second depth to the substrate thickness from about 0.1 to about 0.4 (e.g., from about 0.15 to about from about 0.2 to about 0.4, from about 0.25 to about 0.35) can provide a thickness of the outer peripheral surface that is large enough to avoid stress concentrations where the first peripheral surface and the second peripheral surface meet the outer peripheral surface. Also, providing a ratio of the first width and/or the second width to the substrate thickness from about 0.3 to about 1.6 (e.g., from about to about 1.55, from about 1 to about 1.55) can separate the intersection of the corresponding peripheral surface with the corresponding major surface and the interaction of the corresponding peripheral surface with the outer peripheral surface, which can improve the edge strength of the substrate. One or more of these aspects (e.g., dimension and/or ratios recited above in this paragraph) can improve the edge strength (e.g., B10 edge strength of about 1000 MegaPascals (MPa) or more and/or from about 1200 MPa to about 1700 MPa, median edge strength of about 1700 MPa or more and/or from about 1900 MPa to about 2500 MPa) and/or the bendability of the substrate.

For substrates comprising a thickness from about 25 micrometers (μm) to about 35 μm, providing a first depth and/or a second depth from about 4 μm to about 12 μm in combination with a first width and/or a second width from about 30 μm to about 50 μm can reduce damage to the substrate, simplify handling of the substrate, and improve the edge strength of the substrate. For substrates comprising a thickness of about 35 μm or more, providing a first depth and/or a second depth from about 14 μm to about 24 μm in combination with a first width and/or a second width from about 40 μm to about 60 μm can reduce damage to the substrate, simplify handling of the substrate, and improve the edge strength of the substrate.

Providing a ratio of the first depth and/or the second depth to the substrate thickness from about 0.1 to about 0.4 (e.g., from about 0.15 to about 0.4, from about 0.2 to about 0.4, from about 0.25 to about 0.35) can provide a thickness of the outer peripheral surface that is large enough such that the edge surface is blunt enough to reduce handling concerns, which can simplify handling of the substrate.

Providing a ratio of the first width to the first depth and/or a second width to the second depth in a range from about 2 to about 8 (e.g., from about 2 to about 4, from about 4 to about 8, from about 4 to about 6, from about 4 to about 5.5) can provide a corresponding peripheral surface that is shallow enough to prevent a viscous material disposed over the corresponding major surface from flowing off the edge surface, which allows in-situ formation of coatings on the substrate. Avoiding the viscous fluid from flowing off the edge surface can reduce material waste, avoid contamination of processing equipment, and/or additional cleaning to remove such viscous fluid.

Providing the substrate comprising a glass-based material or a ceramic-based material can enhance puncture resistance and/or impact resistance. Further, such substrates may be chemically strengthened to further enhance impact resistance and/or puncture resistance of the foldable apparatus. Also, the edge surface comprising the peripheral surfaces described herein can improve bendability (e.g., achieving a parallel plate distance in a range from about 1 mm to about 10 mm) by removing stress concentrations on the edge of the substrate.

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

While various features, elements, or steps of particular aspects may be disclosed using the transitional phrase "comprising," it is to be understood that alternative aspects, including those that may be described using the transitional phrases "consisting of" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

What is claimed is:

1. A substrate comprising:

a first major surface extending along a first plane;

a second major surface extending along a second plane substantially parallel to the first plane;

a substrate thickness defined between the first plane and the second plane in a thickness direction perpendicular to the first major surface; and an edge surface extending between the first major surface and the second major surface, the edge surface comprising an outer peripheral point, the edge surface comprising:

an outer peripheral surface comprising a portion of the edge surface within 5 micrometers of an outer plane, the outer plane is perpendicular to the first major surface and intersects the outer peripheral point;

a first peripheral surface extending between the first major surface and the outer peripheral surface comprising a first depth defined as a minimum distance between the outer peripheral surface and the first plane in the thickness direction, and a first width defined as a minimum distance between the outer peripheral surface and the first major surface along a first direction that the first plane extends along; and a second peripheral surface extending between the second major surface and the outer peripheral surface comprising a second depth defined as a minimum distance between the outer peripheral surface and the second plane in the thickness direction, and a second width defined as a minimum distance between the outer peripheral surface and the second major surface along the first direction that the first-second plane extends along, wherein a ratio of the first depth to the substrate thickness is in a range from about 0.1 to 0.35, a ratio of the first width to the substrate thickness is in a range from about 0.3 to about 1.6, and a ratio of the first width to the first depth is in a range from about 2 to about 8, wherein a median edge strength in a two-point bend test is 1700 MegaPascals or more, and wherein:

when the substrate thickness is in a range from about 25 micrometers to about 35 micrometers:

the first depth of the first peripheral surface is in a range from about 4 micrometers to about 12 micrometers, and the first width of the first peripheral surface is in a range from about 30 micrometers to about 50 micrometers, and when the substrate thickness is about 35 micrometers or more:

the first depth of the first peripheral surface is in a range from about 14 micrometers to about 20 micrometers, and the first width of the first peripheral surface is in a range from about 40 micrometers to about 60 micrometers.

2. The substrate of claim 1, wherein the ratio of the first depth to the substrate thickness in a range from 0.2 to about 0.4, and the ratio of the first width to the substrate thickness is in a range from about 1 to about 1.55.

3. The substrate of claim 1:

wherein the substrate thickness is in a range from about 25 micrometers to about 35 micrometers;

wherein the first depth of the first peripheral surface is in a range from about 4 micrometers to about 12 micrometers;

wherein the first width of the first peripheral surface is in a range from about 30 micrometers to about 50 micrometers;

wherein the second depth of the second peripheral surface is in a range from about 4 micrometers to about 12 micrometers; and wherein the second width of the second peripheral surface is in a range from about 30 micrometers to about 50 micrometers.

4. The substrate of claim 3, wherein the ratio of the first width to the substrate thickness is in a range from about 1 to 1.6.

5. The substrate of claim 3, wherein the ratio of the first width to the first depth is in a range from about 4 to 8.

6. The substrate of claim 1:

wherein the substrate thickness is about 35 micrometers or more;

wherein the first depth of the first peripheral surface is in a range from about 14 micrometers to about 18 micrometers;

wherein the first width of the first peripheral surface is in a range from about 40 micrometers to about 60 micrometers;

wherein the second depth of the second peripheral surface is in a range from about 14 micrometers to about 18 micrometers; and wherein the second width of the second peripheral surface is in a range from about 40 micrometers to about 60 micrometers.

7. The substrate of claim 6, wherein the substrate thickness is in a range from about 50 micrometers to about 200 micrometers.

8. The substrate of claim 6, wherein the ratio of the first width to the substrate thickness is in a range from 1 to 1.55.

9. The substrate of claim 6, wherein a ratio of the first width to the first depth is in a range from 2 to about 4.

10. The substrate of claim 6, wherein the ratio of the first depth to the substrate thickness is in a range from 0.18 to 0.34.

11. The substrate of claim 1, wherein the substrate comprises a glass-based material or a ceramic-based material.

12. The substrate of claim 1, wherein the first major surface comprises a first compressive stress region extending to a first depth of compression from the edge surface and a maximum first compressive stress of about 400 MegaPascals or more, and the second major surface comprises a second compressive stress region extending to a second depth of compression from the second major surface and a maximum second compressive stress of about 400 MegaPascals or more.

13. The substrate of claim 1, wherein the substrate comprises a stress under which a probability of failure is lower than 10% for a two-point bend test (B10 edge strength) of about 1000 MegaPascals or more.

14. The substrate of claim 1, wherein the ratio of the first width to the substrate thickness is from 0.5 to 1.55.

15. The substrate of claim 1, wherein the ratio of the first width to the substrate thickness is from 0.53 to 1.55.

16. The substrate of claim 1, wherein the ratio of the first width to the first depth is from 2.5 to 5.2.

17. The substrate of claim 1, wherein the ratio of the first width to the first depth is from 2.58 to 5.18.

18. The substrate of claim 1, wherein the ratio of the first depth to the substrate thickness is from 0.18 to 0.34.

19. The substrate of claim 3, wherein the first depth of the first peripheral surface is in a range from about 4 micrometers to 9 micrometers.

* * * * *